United States Patent [19]

Shimizu

[11] 4,439,659
[45] Mar. 27, 1984

[54] ELECTRODE FEED SYSTEM IN ELECTRICAL MACHINING, CAPABLE OF QUICK-RESPONSE ELECTRODE RETRACTION AND RECIPROCATION

[75] Inventor: Akihiko Shimizu, Kawasaki, Japan

[73] Assignee: Japax Incorporated, Kanagawa, Japan

[21] Appl. No.: 338,902

[22] Filed: Jan. 12, 1982

[30] Foreign Application Priority Data

Jan. 14, 1981 [JP] Japan .................................. 56-3235

[51] Int. Cl.³ ............................................... B23P 1/14
[52] U.S. Cl. .................................. 219/69 V; 204/222; 219/69 G
[58] Field of Search ............... 219/69 G, 69 M, 69 V; 204/129.5, 129.7, 222, 225

[56] References Cited

U.S. PATENT DOCUMENTS

| | | | |
|---|---|---|---|
| 3,271,283 | 9/1966 | Clifford et al. | 219/69 V |
| 3,616,433 | 10/1971 | Williams | 204/129.7 |
| 3,801,487 | 4/1974 | Pahl | 204/129.5 |
| 4,229,635 | 10/1980 | Dinsdale | 219/69 C |
| 4,338,504 | 7/1982 | Gray | 219/69 G |

Primary Examiner—B. A. Reynolds
Assistant Examiner—Alfred S. Keve
Attorney, Agent, or Firm—Karl F. Ross; Herbert Dubno

[57] ABSTRACT

An improved electrode feed system for use in effecting electrical machining between a working electrode and a workpiece electrode across a machining gap has a quick-response electrode retraction and reciprocation capability. The movable electrode is securely supported by an axially movable machining head into which a feed screw extends, the latter being driven by a servo motor responsive via a control circuit to the progress of machining in the gap. In the machining head, the feed screw is in mesh with a feed nut which is restrained from rotation for axially moving the head when the feed screw is rotated by the gap-responsive servo motor, thereby displacing the movable electrode as machining proceeds. The improved system includes a cylinder formed within the machining head and the feed nut is slidably received in the cylinder for axial movement relative thereto, the feed nut being constructed and arranged to define a pair of separate chambers in the cylinder. A plunger-type reciprocation pump is provided outside the machining head to alternately fluid-pressurize the two chambers in the cylinder to axially reciprocate the machining head. The feed nut is spring-biased to a neutral position. In the reciprocation pump, an electric drive motor is rotated alternately in opposite directions to cyclically reciprocate via a feed screw and nut a movable cylinder on a fixed position, whereby to alternately pressurize the respective chambers in the machining head, and thereby axially reciprocate the latter.

12 Claims, 2 Drawing Figures

ELECTRODE FEED SYSTEM IN ELECTRICAL MACHINING, CAPABLE OF QUICK-RESPONSE ELECTRODE RETRACTION AND RECIPROCATION

FIELD OF THE INVENTION

The present invention relates to an electrode feed system for use in effecting electrical machining and, more particularly, to such a system having rapid-response electrode retraction and reciprocation capability. While the invention will be described hereinafter primarily with reference to electrical discharge machining (EDM), it should be understood that the term "electrical machining" is herein intended to include electrochemical machining (ECM), electrochemical-discharge machining (ECDM), electrodepositing (electroplating and electroforming) and any other machining process which has conventionally been recognized and known as within the genre of electrical machining and where the principles of the invention are applicable.

BACKGROUND OF THE INVENTION

In electrical machining, a tool or working electrode is spacedly juxtaposed with a workpiece across a machining gap filled or flooded with a machining liquid and a machining electric current is passed between the tool electrode and the workpiece through the gap to "machine" the workpiece. In EDM, ECM and ECDM, machining signifies the removal of material from the workpiece and in electroplating or electroforming, "machining" signifies deposition of metal from the machining liquid (electrolyte) on the workpiece. In EDM, ECM and ECDM, which are called electroerosive machining in general, machining current is commonly or preferably in the form of a succession of electrical pulses. A pulsed electric current has also been recognized to be advantageous in electrodepositing. As "machining" proceeds, the tool or working electrode can be displaced (advanced or retracted) relative to the workpiece, generally by means of a servo feed system, so as to maintain the size of the machining gap substantially constant.

In electrical discharge machining, a series of timespaced, discrete electrical discharges are created across the machining gap to erosively remove material from the workpiece. Machining chips, gases and tar are thus produced, tending to accumulate in the machining gap and excessively contaminate the machining region and thereby tending to give rise to continuous arcing or short-circuiting conditions. In order to facilitate removal of these gap products from the machining zone, therefore, it has been recognized to be desirable that apart from the servo-feed system principally designed to follow up material removal and to respond to a temporary short-circuiting, means be provided designed to reciprocate the working electrode or periodically retract it with a given time interval or in response to accumulation of the discharge products in the machining gap, thereby assuring consecutive renewal of fresh or less-contaminated machining liquid in the machining site.

A typical prior EDM electrode feed system having the capability of not only servo feed but also electrode retraction and reciprocation as described is shown schematically in FIG. 1 of the attached drawing. The system includes an electric motor, e.g. a DC motor, stepping motor or AC motor, mounted on a column 2 standing upright from a bed 3 of an EDM machine equipment. The motor 1, which is rotatable bidirectionally, has its output drive shaft drivingly connected to a feed screw 4 which extends into a hollow machining head 5. The feed screw 4 is in mesh with a feed nut 6 secured to the machining head 5 at its shoulder. The machining head 5 is slidably guided on a vertical guide plane 5a in the column 2 for vertical up and down movement and is restrained from rotary movement. The machining head 5 is shown carrying a working electrode 7 juxtaposed with a workpiece 8 which is securely mounted on a work support 9 carried by a cross-feed arrangement 10 for positioning the workpiece in a horizontal plane. The workpiece 8 is immersed in a liquid dielectric 10' contained in a work tank 11. The motor 1 responds not only to a servo feed signal furnished by a servo control circuit 12 in response to a gap signal to displace the working electrode 7 so as to maintain the gap spacing, but also to a drive signal furnished by a reciprocation control circuit 13 to effect reciprocation or cyclic retraction of the working electrode 7. The servo gap signal is derived from the machining gap between the electrode 7 and the workpiece 8 and may as typical be sensed at a gap sensing circuit 14, connected to the electrode 7 and the workpiece 8. The reciprocation control circuit 13 is fed with a preset signal and may additionally be responsive to a gap signal.

It is customary that the extent of the retraction or the amplitude of the reciprocation of the electrode amounts at maximum to several millimeters in electrochemical machining and electrodeposition but is as small as at most 1 mm and typically 0.05 to 0.8 mm in electrical discharge machining. The period of intermittent retraction or reciprocation is typically less than 1 second. It is well known that the particular extent or amplitude and the period of reciprocation or intermittent retraction depend on the particular methods of electrical machining and the particular machining results required and conditions encountered and is preset in the control circuit 13.

On the other hand, it is increasingly being recognized that the servo system employing a motor 1, with a feed screw 4 and nut 6 transmission, especially designed to step-feed or incrementarily feed with a fine preset increment of displacement the machining head 5 and the tool electrode 7, is advantageous and gives rise to a marked improvement in operation efficiency over hydraulic servo systems.

Regardless of the type of motor employed, however, it has been found that motor servo systems are much slower in response than hydraulic servo systems and, when operated to effect intermittent retraction or reciprocation of the tool electrode in addition to the servo feed function, are incapable of providing sufficient machining efficiency, especially where a narrow and deep hole or recess is to be machined or a massive and heavy electrode is used.

OBJECTS OF THE INVENTION

It is, accordingly, an important object of the present invention to provide an improved electrode feed system in electrical machining, which permits quick-response retraction and reciprocation of the electrode.

The present invention specifically seeks to provide an electrode feed for use in electrical machining, including a feed screw and a feed nut functioning as a drive transmission of the output of an electric servo motor for servo-control feed of the tool electrode and constructed and arranged in a novel manner such as to allow intermittent retractions or reciprocation of the tool electrode with a quicker response than the conventional system.

SUMMARY OF THE INVENTION

These and other objects are attained, in accordance with the present invention, by an electrode feed system for use in effecting electrical machining between a working electrode and a workpiece electrode across a machining gap, which system comprises: an axially movable electrode head for securely supporting one of said working and workpiece electrodes; a feed screw extending into the said electrode head and drivingly coupled with an electric motor for rotation therewith; a driver circuit for providing a drive signal to rotate the said motor; a feed nut in mesh with the said feed screw in the said electrode head and restrained from rotation therein for axially moving the said head when the said feed screw is rotated in response to the said drive signal applied to the said motor, thereby displacing the said one electrode to follow the progress of electrical machining in the said machining gap; a cylinder formed within the said electrode head having the said feed nut slidably received in the said cylinder for axial movement relative thereto, the said nut being constructed and arranged to define a pair of separate chambers in the said cylinder; and reciprocation pump means for alternately fluid-pressurizing the said two separate chambers in the said cylinder, thereby axially reciprocating the said electrode head.

Specifically, the said reciprocation pump means may comprise: a separate cylinder disposed outside the said electrode head and having a second pair of separate chambers therein, each of the chambers of the second pair being in fluid communication with a respective chamber of the first-mentioned pair in the first-mentioned cylinder; and reciprocating drive means for pressurizing one chamber of the second pair to fluid-pressurize one chamber of the first pair which is in fluid communication therewith and thereupon pressurizing the other chamber of the second pair to fluid-pressurize the other chamber of the first pair which is in fluid communication therewith, thereby axially reciprocating the said electrode head.

The drive means may include: a piston fixed in position and slidably received in the second cylinder while defining the said two separate chambers of the second pair therein; and bidirectional motor means drivingly coupled with the said second cylinder for reciprocating the second cylinder relative to the piston fixed in position, thereby alternately pressurizing the respective chambers of the said second pair.

The said bidirectional motor means can comprise a second electric motor rotatable in a first and second rotary directions and a second driver circuit for rotating the second motor in the two rotary directions alternately. The second driver circuit may be adapted to furnish the second motor with an energizing circuit in the form of a succession of pulses to incrementally rotate the second motor in each of the two directions as appropriate. The second motor may be a stepping motor or a DC motor equipped with an encoder.

The second driver circuit can further comprise: two separate timers for setting a first and second time periods for rotation of the second motor in the first and second directions, respectively, in each alternate cycle.

One or both of the timers may have an input connected to the machining gap for determining at least one of the said time periods in accordance with a condition of the machining gap.

Alternatively or in addition, setting means may be provided in the second driver circuit for establishing the frequency or period of alternative rotations of the second motor. The setting means may have an input connected to the machining gap for determining the said frequency or period in accordance with a condition of the machining gap.

The said feed nut is preferably supported resiliently in the said first cylinder, thereby tending to occupy a neutral position therein.

BRIEF DESCRIPTION OF THE DRAWING

In the attached drawing.

SPECIFIC DESCRIPTION

Figure 1:
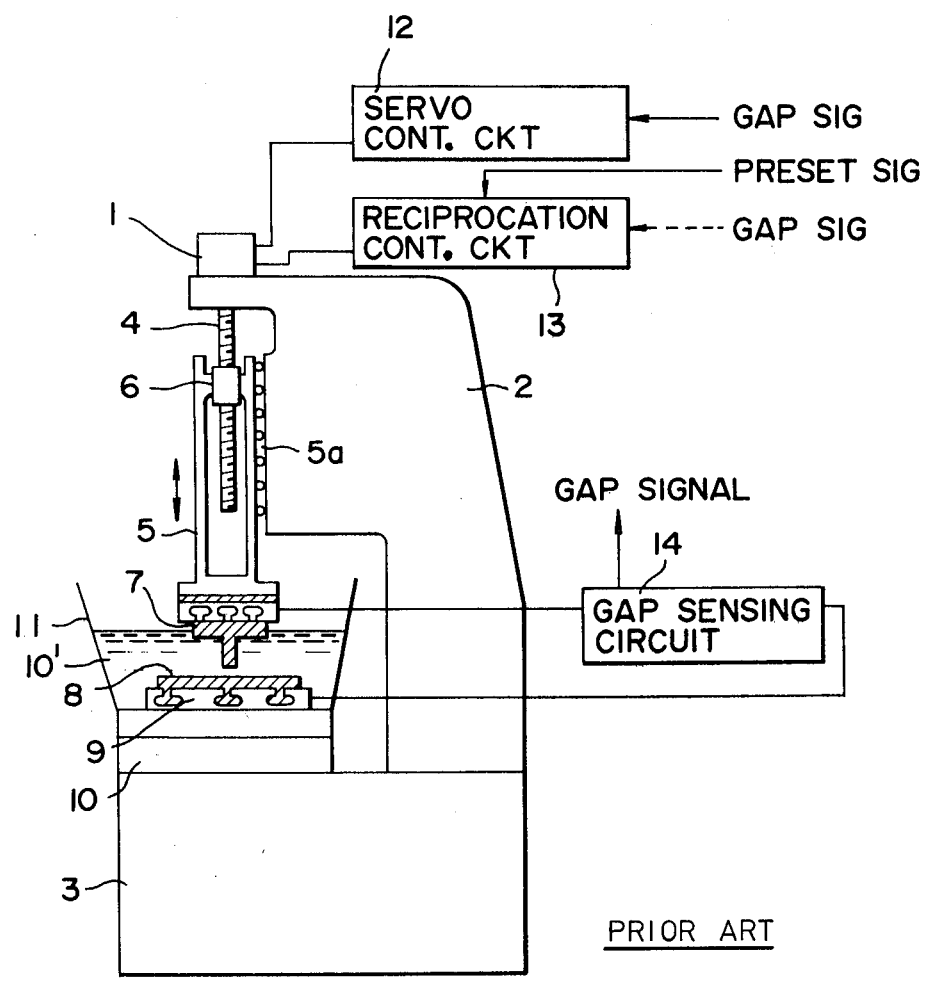
FIG. 1 is a side elevational view of an electrical discharge machine incorporating a conventional electrode feed system schematically shown partly in section and partly in block diagram form.
Figure 2:
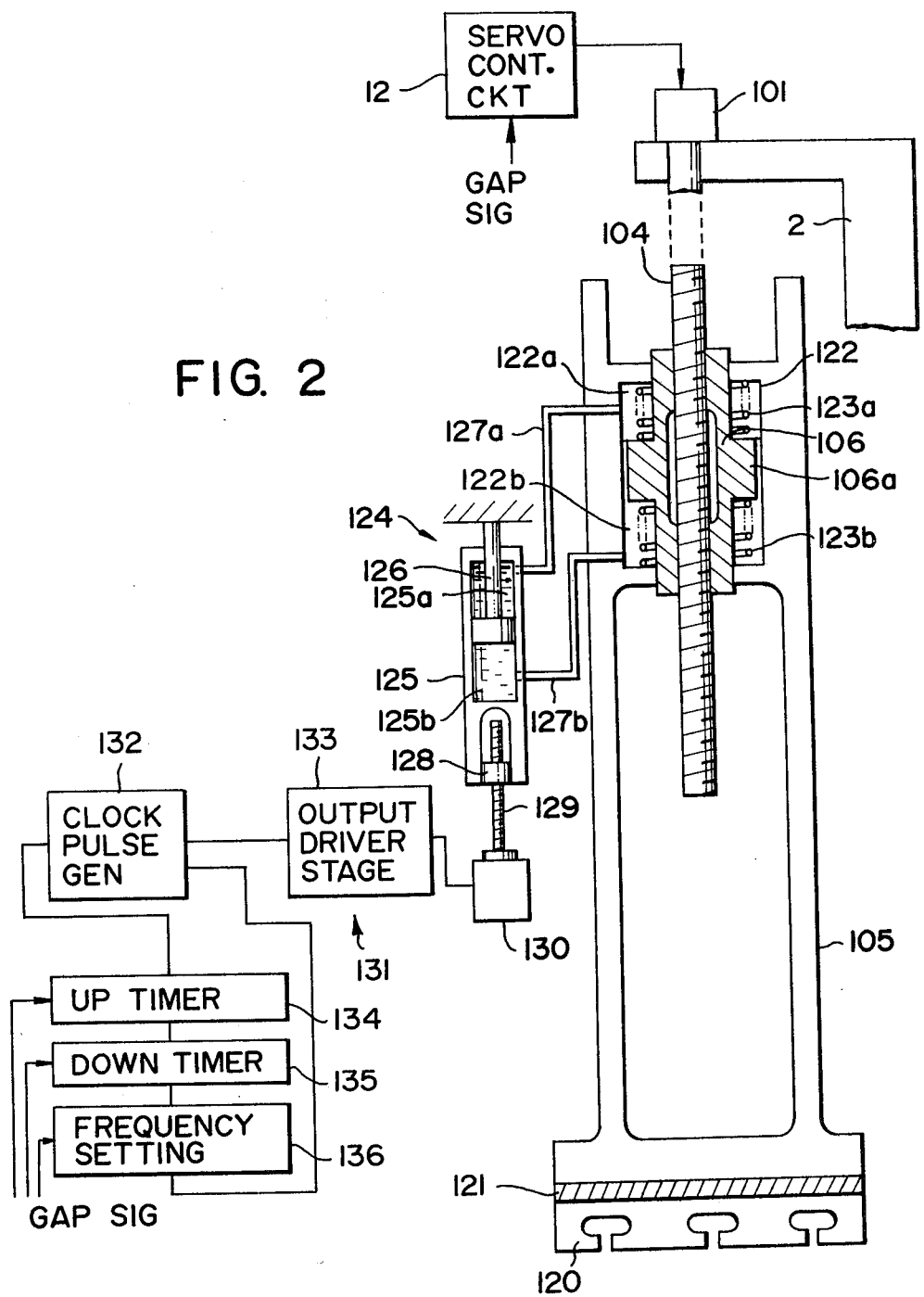
FIG. 2 is a schematic view of a novel electrode feed system embodying the present invention, shown partly in side elevational section and partly in a block diagram form.

In FIG. 2, a motor 101, e.g. a stepping motor, DC motor or AC motor, is shown, as in FIG. 1, mounted on a column 2 of an EDM machine equipment and is designed here to be exclusively energizable by a servo-control circuit 12 as shown in FIG. 1. The motor 101, which is rotatable unidirectionally or bidirectionally, has its drive shaft, as in the system of FIG. 1, drivingly connected to a feed screw 104 which extends into a hollow machining head 105. The machining head 105 is here again slidably guided on a vertical guide plane (as 5a in FIG. 1) in the column 2 for vertical up and down movement and may be restrained from rotary movement. The machining head 105 has an electrode support 120 which is securely attached thereto through an insulating plate 121 and which, of course, carries a tool or working electrode (as 7 in FIG. 1) juxtaposed with a workpiece (as 8 in FIG. 1). The workpiece is arranged and positioned as described in connection with FIG. 1.

The feed screw 104 is, as in the system of FIG. 1, in mesh with a feed nut 106 which is, however, not secured here to the machining head 105 but is designed to allow the latter to be slidably moved relative to itself.

Thus, the machining head 105 is formed with an internal cylindrical cavity 122 and the feed nut 106 having a central flange 106a is designed to operate as a piston in a cylinder constituted by the internal cavity 122 as will be described.

It will be understood that the feed nut 106 here is simply restrained from rotary movement and, is as in the system of FIG. 1, moved vertically to vertically displace the machining head 105 when the feed screw 104 is rotated by the motor 101 in response to the servo-control circuit 12 to displace the working electrode so as to maintain the machining gap substantially constant or to advance the working electrode at a precise rate as machining proceeds in the working gap.

The feed nut 106 is designed to define a pair of separate coaxial chambers 122a and 122b in the cylinder 122. Balancing springs 123a and 123b are fitted in the chambers 122a and 122b, respectively, to resiliently support the feed nut 106 in the cylinder 122 and to force the feed nut 106 to be normally located at its central neutral position therein.

A reciprocation pumping unit 124 is provided outside of the machining head 105 to alternately the two separate chambers 122a and 122b in the cylinder 122 with a pressure fluid, e.g. oil or air, thereby to vertically reciprocate the machining head 105.

The reciprocation pumping unit 124 shown comprises a plunger pump having a cylinder 125 and a piston 126. The piston 126 is fixed in position and slidably received in the cylinder 125 while defining two separate chambers 125a and 125b therein which are in fluid communication with the two separate chambers 122a and 122b in the cylinder 122, respectively, via conduits 127a and 127b. The cylinder 125 has a nut 128 secured thereto, the nut being in mesh with a screw 129 driven by a motor 130. The pitch of the screw thread/screw-nut combination 129-128 is smaller than that of the screw-nut 104-106 and typically ½ to 1/10 of the latter in consideration of the ratio of pressure rise and thus according to the weights of the machining head 105 and the tool electrode and the pressure-receiving area of the nut 106.

The motor 130 is thus a bidirectional motor, e.g. a DC motor or stepping motor, furnished with drive signals of one and the other polarity from a driver circuit 131, each of which signals is preferably in the form of a succession of pulses to incrementary rotate the motor 130 in one or the other of the two directions. It will be seen that when the motor 130 is rotated in one direction, the cylinder 125 is moved upwards relative to the piston 126 fixed in position, thereby increasing the fluid pressure in the chamber 125b. This will cause a pressure increase in the chamber 122b in the cylinder 122, thereby moving the machining head 105 and hence the tool electrode downwards. When the motor 130 is rotated in the other direction, the cylinder 125 is moved downwards relative to the fixed piston 126, thereby increasing the fluid pressure in the cylinder 125a. This will cause a pressure increase in the chamber 122a in the cylinder 122, thereby moving the machining head 105 and hence the tool electrode upwards. Thus, the alternate bidirectional rotation of the motor 130 causes a reciprocation or intermittent retraction of the tool electrode relative to the workpiece.

The driver circuit 131 for motor 130 shown comprises a clock generator 132 and an output driver stage 133 and includes three setting stage stages, viz. up-time setting 134, down-time setting stage 135 and frequency setting stage 136. The setting stage 134 establishes a time period in which the motor 130 rotated in one direction and thus the tool electrode is retracted or moved upwards in each electrode reciprocation cycle and is constituted by a timer, e.g a preset counter. The setting stage 135 which is likewise constituted by a timer, e.g. a preset counter, establishes a time period in which the motor 130 is rotated in the other direction and thus the tool electrode is returned to position (i.e. servo-controlled position) or moved downwards in each electrode reciprocation cycle. The setting stage 136 establishes the frequency or period of electrode reciprocations.

From the construction of the system described, it will thus be seen that the electrode reciprocation is exclusively effected by the pumping unit 125 controlled by the driver circuit 131 while a fine electrode servo feed is effected exclusively by the motor 101 controlled by the servo circuit 12. The two drive units operate independently of one another and operate to apply two independent drive feed signals to the tool electrode via a common nut/cylinder arrangement uniquely constructed.

Thus, the system of the present invention is capable of effecting an extremely quick response electrode retraction and reciprocation on one hand while retaining a fine and accurate control capability in the electrode follow-up or servo feed operation on the other hand. In the operation of the novel construction of the system described, each time a timing signal is generated by the frequency setting stage 136, the up timer 134 initiates an up-movement signal to quickly retract the tool electrode through a hydraulic power drive mechanism which is much quicker in response than the conventional motor (screw/nut) power drive mechanism. When this up-movement is terminated, the down timer stage 135 is ready to immediately initiate a down-movement signal to quickly return the tool electrode to position through the hydraulic power drive mechanism.

In the driver circuit 131, each of the timers 134 and 135 and the frequency setting stage 136 is shown additionally having an input connected to the machining gap for determining the electrode up-movement time (stroke) and down-movement time (stroke) and the rate of repetition of the electrode reciprocations, in accordance with a condition of the machining gap.

There is thus provided, in accordance with the present invention, a novel and improved electrode feed system for use in electrical machining equipment.

What is claimed is:

1. An electrode feed system for use in effecting electrical machining between a working electrode and a workpiece electrode across a machining gap, said system comprising:

an axially movable electrode head for securely supporting one of said electrodes;

a feed screw extending into said electrode head and drivingly coupled with an electric motor for rotation therewith;

a driver circuit for providing a drive signal to rotate said motor;

a feed nut in mesh with said feed screw in said electrode head and restrained from rotation therein for axially moving said head when said feed screw is rotated in response to said drive signal applied to said motor, thereby displacing said one electrode to follow the progress of elctrical machining in said machining gap;

a cylinder formed within said electrode head and having said feed nut slidably received therein for axial movement relative thereto, said nut being constructed and arranged to define a pair of separate chambers in said cylinder; and reciprocation pump means for alternately pressurizing said two separate chambers in said cylinder with a pressure fluid, thereby axially reciprocating said electrode head.

2. The system defined in claim 1 wherein said reciprocation pump means comprises:

a second cylinder disposed outside said electrode head and having a second pair of separate chambers therein, each of the chambers of said second pair being in fluid communication with a respective chamber of the first-mentioned pair in the first-mentioned cylinder; and reciprocating drive means for pressurizing one chamber of said second pair to fluid-pressurize one chamber of said first pair which is in fluid communication therewith and thereupon pressurizing the other chamber of said second pair to fluid-pressurize the other chamber of said first pair which is in fluid communication therewith, thereby axially reciprocating said electrode head.

3. The system defined in claim 2 wherein said drive means includes:
  a piston fixed in position and slidably received in said second cylinder while defining said two separate chambers of said second pair therein; and
  bidirectional motor means drivingly coupled with said second cylinder for reciprocating said second cylinder relative to said fixed piston, thereby alternately pressurizing the respective chambers of said second pair.

4. The system defined in claim 3 wherein said bidirectional motor means comprises: a second electric motor rotatable in a first and second rotary directions and a second driver circuit for rotating said second electric motor in said two rotary directions alternately.

5. The system defined in claim 4 wherein said second driver circuit is adapted to furnish said second electric motor with an energizing electric current in the form of a succession of electrical pulses to incrementally rotate said second electric motor in each of said two directions.

6. The system defined in claim 5 wherein said second electric motor is a stepping motor.

7. The system defined in claim 4 wherein said second electric motor comprises a DC motor.

8. The system defined in claim 4 wherein said second driver circuit further comprises: two separate timers for setting a first and second time periods for rotation of said second electric motor in said first and second directions, respectively, in each alternate cycle of reciprocation.

9. The system defined in claim 8 wherein at least one of said timers has an input connected to said machining gap for controlling at least one of said time periods in accordance with a condition of said machining gap.

10. The system defined in claim 4, claim 8 or claim 9 wherein said second driver circuit further comprises: setting means for establishing the frequency or period of alternate rotations of said second motor.

11. The system defined in claim 10 wherein said setting means has an input connected to said machining gap for controlling said frequency or period in accordance with a condition of said machining gap.

12. The system defined in claim 1 wherein said feed nut is resiliently supported in said cylinder so as to tend to occupy a neutral position therein.

* * * * *